(12) United States Patent
Muramatsu

(10) Patent No.: US 7,978,233 B2
(45) Date of Patent: Jul. 12, 2011

(54) IMAGE PROCESSING APPARATUS WITH CORRECTING SECTION FOR GRADATION CORRECTION

(75) Inventor: Masaru Muramatsu, Yohohama (JP)

(73) Assignee: Nikon Corporation, Tokyo (JP)

( * ) Notice: Subject to any disclaimer, the term of this patent is extended or adjusted under 35 U.S.C. 154(b) by 567 days.

(21) Appl. No.: 12/073,346

(22) Filed: Mar. 4, 2008

(65) Prior Publication Data
US 2008/0239118 A1    Oct. 2, 2008

(30) Foreign Application Priority Data
Mar. 29, 2007    (JP) ................................ 2007-087772

(51) Int. Cl.
*H04N 9/68*    (2006.01)
(52) U.S. Cl. ....................................................... 348/234
(58) Field of Classification Search .................. 348/234, 348/235, 254, 255, 256, 222.1, 229.1
See application file for complete search history.

(56) References Cited

U.S. PATENT DOCUMENTS

| | | | | |
|---|---|---|---|---|
| 5,517,333 A | * | 5/1996 | Tamura et al. ................. | 358/518 |
| 6,040,860 A | * | 3/2000 | Tamura et al. ................. | 348/252 |
| 7,375,758 B2 | * | 5/2008 | Muramatsu ..................... | 348/364 |
| 7,382,414 B2 | * | 6/2008 | Nakajima et al. .............. | 348/625 |
| 2002/0036697 A1 | * | 3/2002 | Mori et al. ..................... | 348/229 |
| 2008/0253681 A1 | * | 10/2008 | Chesnokov ..................... | 382/274 |

FOREIGN PATENT DOCUMENTS

| | | |
|---|---|---|
| EP | 1 638 312 A2 | 3/2006 |
| GB | 2 417 381 A | 2/2006 |
| JP | A-06-253176 | 9/1994 |

OTHER PUBLICATIONS

Chiu et al., "Spatially Nonuniform Scaling Functions for High Contrast Images," Proceedings of Graphics Interface, vol. 93, pp. 245-254, 1993.

Oct. 27, 2010 Office Action issued in European Patent Application No. 08 250 954.8.

* cited by examiner

*Primary Examiner* — Nicholas G Giles

(74) *Attorney, Agent, or Firm* — Oliff & Berridge, PLC

(57) ABSTRACT

An image processing apparatus includes an input section, an adjusting section, and a correcting section.

The input section acquires image data and information about subject condition at the time of photographing the image data. The adjusting section determines a brightness enhancement amount of dark area gradation of the image data, depending on the subject condition at the time of photographing. The correcting section performs image correction of brightness enhancement on the dark area gradation of the image data according to the brightness enhancement amount determined by the adjusting section.

10 Claims, 7 Drawing Sheets

Kr

| 0.0 | 0.1 | 0.1 | 0.1 | 0.1 | 0.1 | 0.1 | 0.0 |
|---|---|---|---|---|---|---|---|
| 0.1 | 0.2 | 0.4 | 0.4 | 0.4 | 0.4 | 0.2 | 0.1 |
| 0.1 | 0.4 | 1.0 | 1.0 | 1.0 | 1.0 | 0.4 | 0.1 |
| 0.1 | 0.4 | 1.0 | 1.0 | 1.0 | 1.0 | 0.4 | 0.1 |
| 0.1 | 0.4 | 1.0 | 1.0 | 1.0 | 1.0 | 0.4 | 0.1 |
| 0.1 | 0.4 | 1.0 | 1.0 | 1.0 | 1.0 | 0.4 | 0.1 |
| 0.1 | 0.2 | 0.4 | 0.4 | 0.4 | 0.4 | 0.2 | 0.1 |
| 0.0 | 0.1 | 0.1 | 0.1 | 0.1 | 0.1 | 1.0 | 0.0 |

FIG.5

IMAGE PROCESSING APPARATUS WITH CORRECTING SECTION FOR GRADATION CORRECTION

CROSS REFERENCE TO RELATED APPLICATION

This application is based upon and claims the benefit of priority from Japanese Patent Application No. 2007-087772, filed on Mar. 29, 2007, the entire contents of which is incorporated herein by reference.

BACKGROUND

1. Field

The present invention relates to an image processing apparatus, an imaging apparatus, and an image processing program.

2. Description of the Related Art

Conventionally, there is known a phenomenon such that the gradation compresses dark in the dark area gradation of image data by photographing a subject having a large luminance difference. Japanese Unexamined Patent Application Publication No. H06-253176 discloses a technique which determines the gradation correcting property based on signal analysis of the image data in order to correct such biased gradation.

With the above-mentioned related art, there has been a case in which gradation of the main subject is compressed in order to eliminate the bias in dark area gradation, only resulting in a worsened appearance.

Additionally, with the image data including a night view, there has also been a case in which the entire dark area stands out brightly, only resulting in ruining the original impression of the night view.

SUMMARY

Thus, the present invention provides a gradation correcting technique by which a processing result close to the impression (appearance) of the subject at the time of photographing can be obtained.

(1) An image processing apparatus of the present invention includes an input section, an adjusting section, and a correcting section.

The input section acquires image data and information about subject condition at the time of photographing the image data. The adjusting section determines a brightness enhancement amount of dark area gradation of the image data, depending on the subject condition at the time of photographing. The correcting section performs image correction of brightness enhancement on the dark area gradation of the image data according to the brightness enhancement amount determined by the adjusting section.

(2) Preferably, the input section acquires subject luminance as the subject condition. The adjusting section reduces the brightness enhancement amount of the dark area gradation as the subject luminance becomes lower.

(3) Also preferably, the adjustment section raises the brightness enhancement amount of the dark area gradation as a signal component of the image data becomes relatively darker compared with the subject luminance.

(4) Also preferably, the adjusting section determines the brightness enhancement amount for each subregion of the image data. The adjusting section executes one of a group of processes composed of an averaging process, a weighted averaging process, a maximal value calculating process, and a mode value and intermediate value calculating process of the brightness enhancement amount for each of the subregions, to determine a representative value of the brightness enhancement amount. The correcting section corrects the dark area gradation of the image data according to the representative value of the brightness enhancement amount.

(5) Also preferably, the adjusting section determines the brightness enhancement amount to be lower for a subregion located nearer to a fringe of the image.

(6) The imaging apparatus of the present invention includes an image processing apparatus described in any one of the above-mentioned items 1 to 5, and an imaging section which photographs the subject to generate image data. The image processing apparatus corrects the dark area gradation of the image data generated by the imaging section.

(7) The image processing program of the present invention is a program which causes a computer to function as an image processing apparatus described in any one of the items 1 to 5.

BRIEF DESCRIPTION OF THE DRAWINGS

FIG. 5 shows an example of parameter Kr (i);

DETAILED DESCRIPTION OF THE EMBODIMENTS

[1] Description of an Arrangement of an Imaging Apparatus 11

Figure 1:
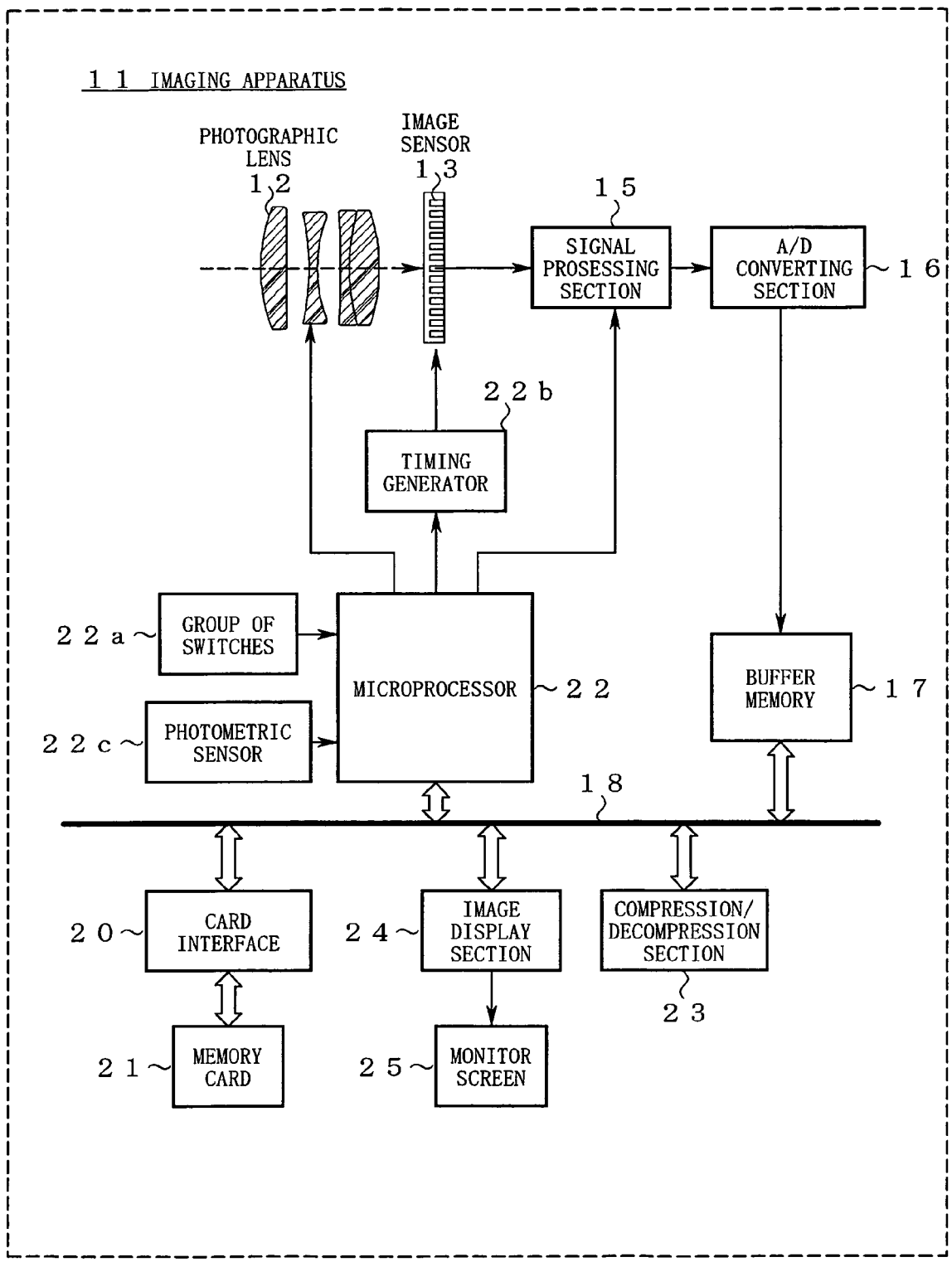
FIG. 1 is a block diagram showing an arrangement of an imaging apparatus 11.

FIG. 1 is a block diagram showing the arrangement of the imaging apparatus 11 (including the image processing apparatus).

In FIG. 1, the imaging apparatus 11 has a photographic lens 12 mounted thereon. A light receiving surface of an image sensor 13 is provided in the image space of the photographic lens 12. The operation of the image sensor 13 is controlled by output pulses from a timing generator 22b. The image data generated by the image sensor 13 is temporarily stored in a buffer memory 17 via a signal processing section 15 (including a gain adjustment section corresponding to imaging sensitivity) and an A/D converting section 16. The buffer memory 17 is connected to a bus 18. A card interface 20, a microprocessor 22, a compression/decompression section 23, and an image display section 24 are connected to the bus 18. The card interface 20 records the image data in a removable memory card 21. In addition, a group of switches 22a of the imaging apparatus 11, the timing generator 22b, and a photometric sensor 22c are connected to the microprocessor 22. Furthermore, the image display section 24 displays images or the like on a monitor screen 25 provided at the back side of the imaging apparatus 11.

[2] Description of Image Processing

Figure 2:
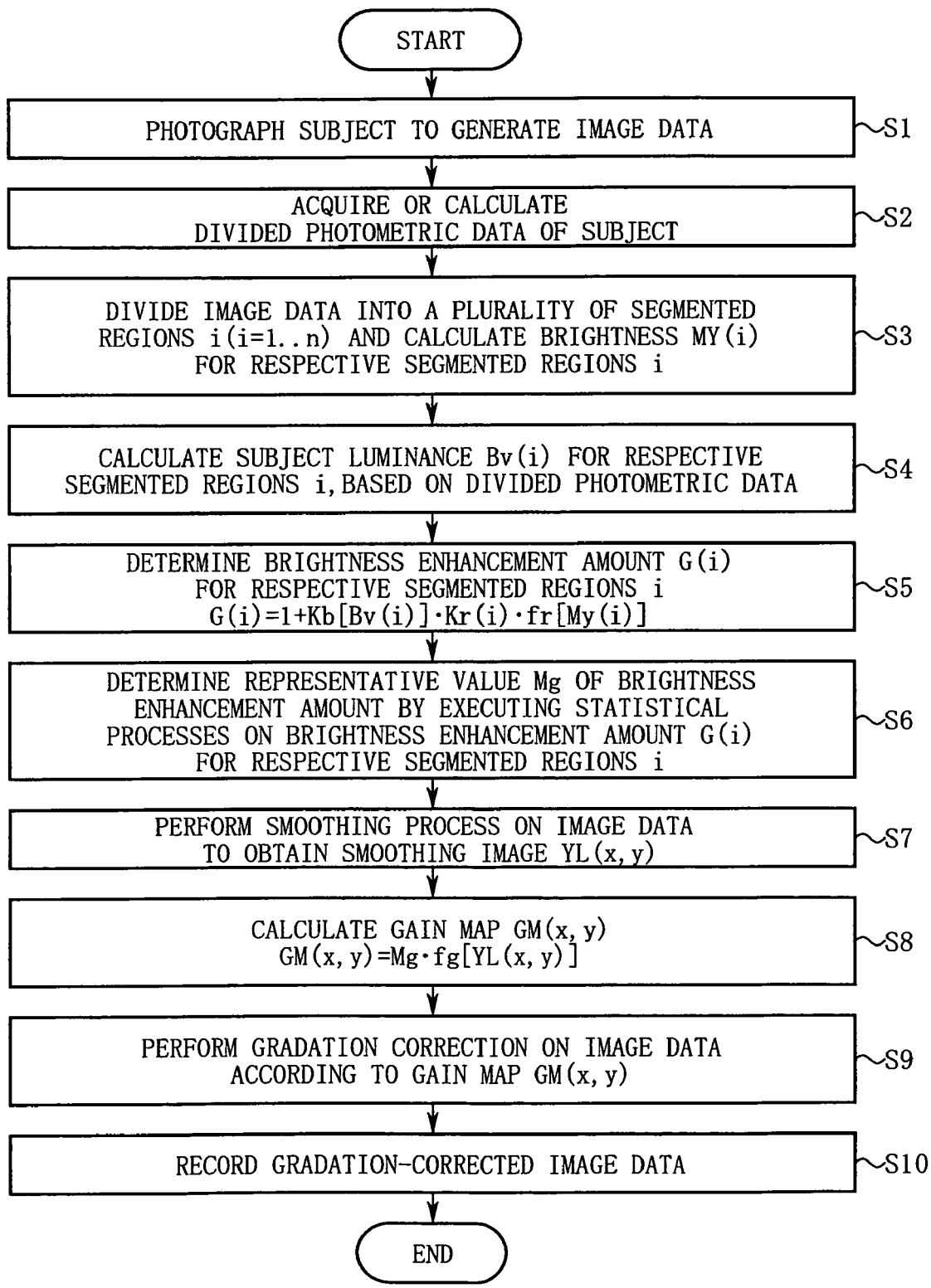
FIG. 2 is a flow chart illustrating an operation of the imaging apparatus 11.

FIG. 2 is a flow chart illustrating the operation of the imaging apparatus 11. In the following, the operation will be described in accordance with the step numbers shown in FIG. 2.

Step S1: The imaging apparatus 11 photographs the subject image in response to the user's release operation to generate image data. The image data read from the image sensor 13 is temporarily recorded in the buffer memory 17 via the signal processing section 15 and the A/D converting section 16.

Step S2: The microprocessor 22 acquires or calculates divided photometric data when the image data is photographed.

For example, the microprocessor 22 may acquire spectrophotometrical data from a photometric sensor 22c immediately before the photographing of step S1.

Also, for example, the microprocessor 22 may acquire the subject luminance for use as the divided photometric data by calculating back the luminance component of the image data from the aperture value, imaging sensitivity, and charge accumulation time at the time of photographing.

The card interface 20 records the obtained divided photometric data in the memory card 21 together with the image data.

Step S3: The microprocessor 22 reads the image data from the memory card 21 or the buffer memory 17. The microprocessor 22 divides the read out image data into a plurality of segmented regions i (i=1 ... n). For example, 64 segmented regions i can be obtained by dividing the data into an eight-row by eight-column matrix. The microprocessor 22 calculates the average value of the luminance component for each segmented region i, as the brightness My (i).

Step S4: The microprocessor 22 allocates the divided photometric data obtained in step S2 for each segmented region i, and calculates the subject luminance Bv (i) for each segmented region i.

Step S5: The microprocessor 22 calculates the following equation for each segmented region i and determines the brightness enhancement amount G (i) for each segmented region i.

$$G(i)=1+Kb[Bv(i)]*Kr(i)*fr[My(i)]$$ [1]

Figure 3:
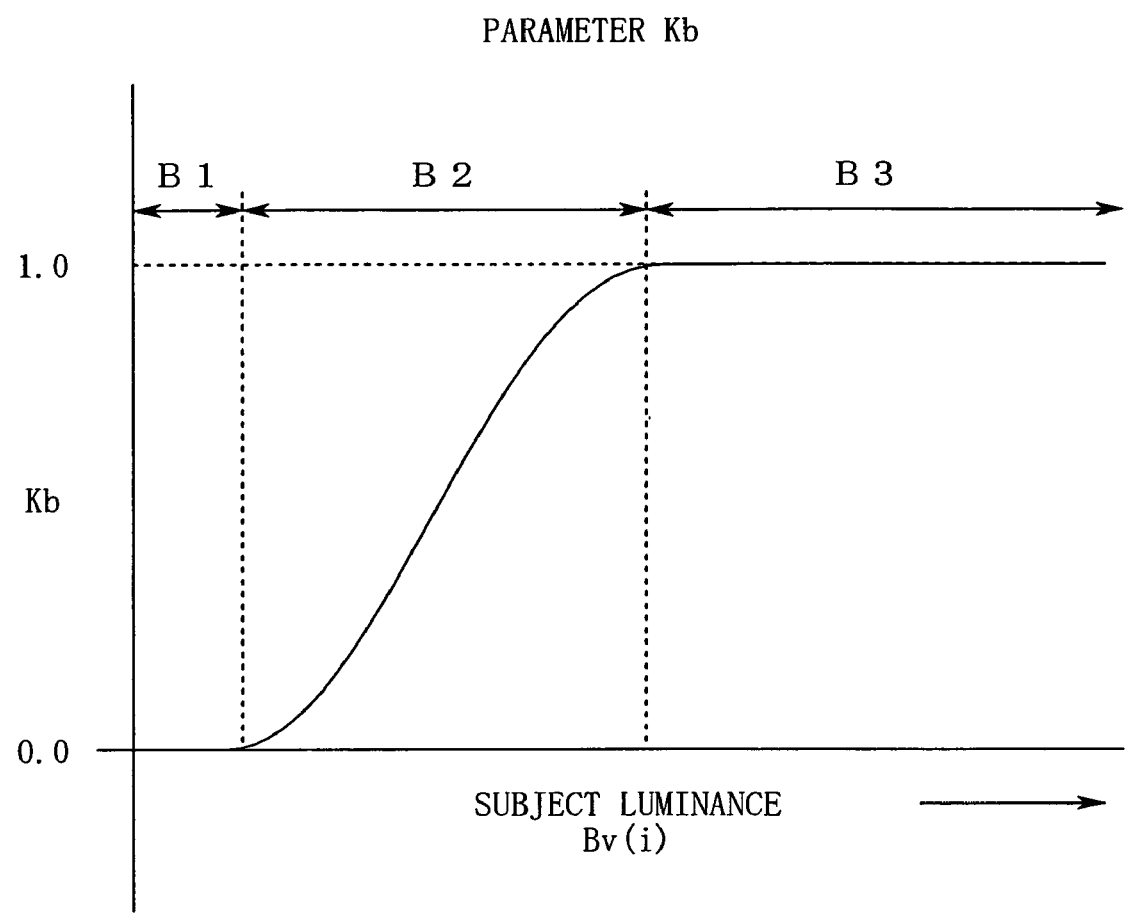
FIG. 3 shows an example of parameter Kb [Bv (i)]

FIG. 3 shows an example of parameter Kb [Bv (i)] in equation [1].

If the subject luminance Bv (i) is so low that perception by the human eye is difficult (range B1 in FIG. 3), parameter Kb [Bv (i)] is zero. If, on the contrary, the subject luminance Bv (i) is sufficiently high that there is no difficulty in perceiving the gradation (range B3 in FIG. 3), parameter Kb [Bv (i)] is 1. If the subject luminance Bv (i) is in between the above cases (range B2 in FIG. 3), parameter Kb [Bv (i)] becomes gradually larger as the subject luminance Bv (i) becomes higher.

Figure 4:
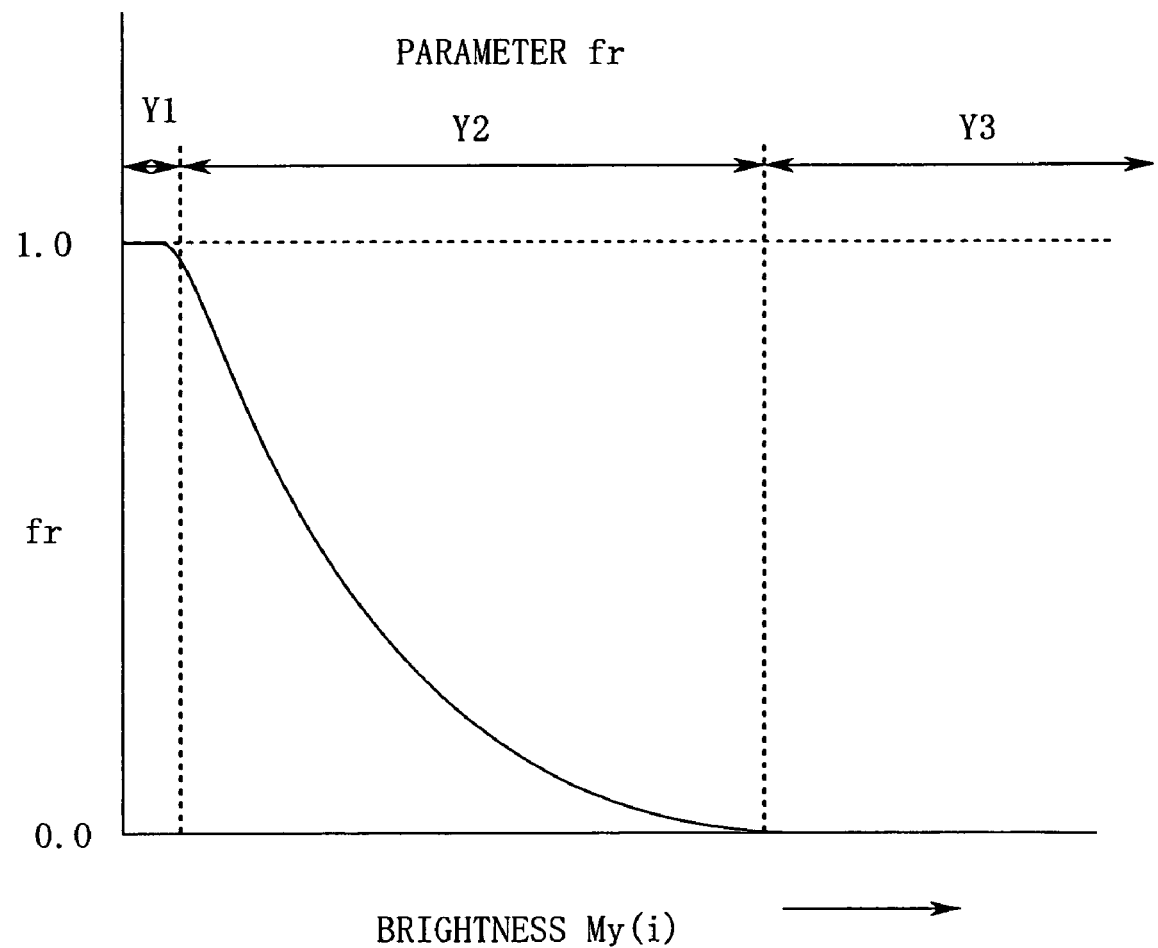
FIG. 4 shows an example of parameter fr [My (i)]

FIG. 4 shows an example of parameter fr [My (i)] of equation [1].

If the brightness My (i) is so low that gradation bias to the black side is outstanding (range Y1 in FIG. 4), parameter fr [My (i)] is 1. If, on the contrary, the brightness My (i) is sufficiently high such that no enhancement of brightness is required (range Y3 in FIG. 4), parameter fr [My (i)] is zero. If the brightness My (i) is in between the above cases (range Y2 in FIG. 4), parameter fr [My (i)] becomes gradually smaller as the brightness My (i) becomes higher.

FIG. 5 shows an example of parameter Kr (i) in equation [1].

In subregions i located at the center of the image, parameter Kr (i) is 1. On the contrary, parameter Kr (i) is 0.1 or zero in subregions i located at the fringe of the image. In subregions i located in between, parameter Kr (i) becomes gradually smaller for regions located further away from the center of the image.

Step S6: The microprocessor 22 determines a representative value Mg of the brightness enhancement amount by executing statistical processes such as an averaging process, a weighted averaging process, a maximal value calculating process, a mode value or intermediate value calculating process, based on a plurality of brightness enhancement amounts G (i) as the population. By selecting the type of these statistical processes, it becomes possible to control the degree of reflecting the brightness enhancement more precisely.

Step S7: The microprocessor 22 performs the smoothing process of the following equation on the luminance component Y (x, y) of the image data and obtains a smoothing image YL (x,y).

$$YL(x, y) = \sum_{i=-r}^{r} \sum_{j=-r}^{r} Y(x+i, y+j) Lpw\left[(i^2 + j^2)^{1/2}\right]$$ [2]

Figure 6:
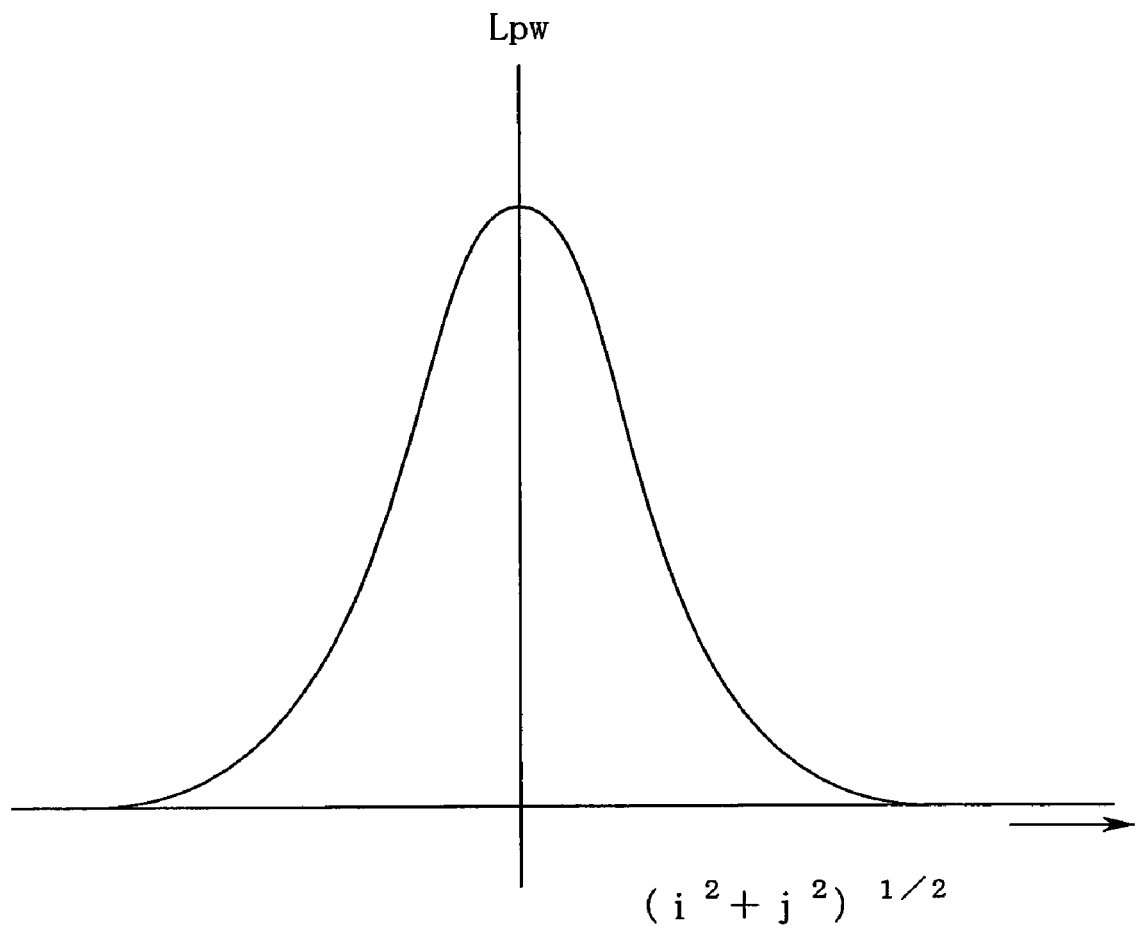
FIG. 6 shows an example of parameter Lpw.

In the above equation, (x, y) is a coordinate value indicating a location of a pixel to be processed. (i, j) is a relative coordinate value of a neighboring pixel to be reflected in the smoothing processing. r is a radius value indicating the range of selecting the neighboring pixel. Lpw is a weighting ratio of the neighboring pixel as shown in FIG. 6. From the smoothing image YL (x, y) thus obtained, it can be known whether a pixel location (x, y) of the image data is located in a bright region or a dark region.

Step S8: The microprocessor 22 calculates the gain map GM (x, y) using the following equation.

$$GM(x, y)=Mg*fg[YL(x, y)])$$ [3]

Figure 7:
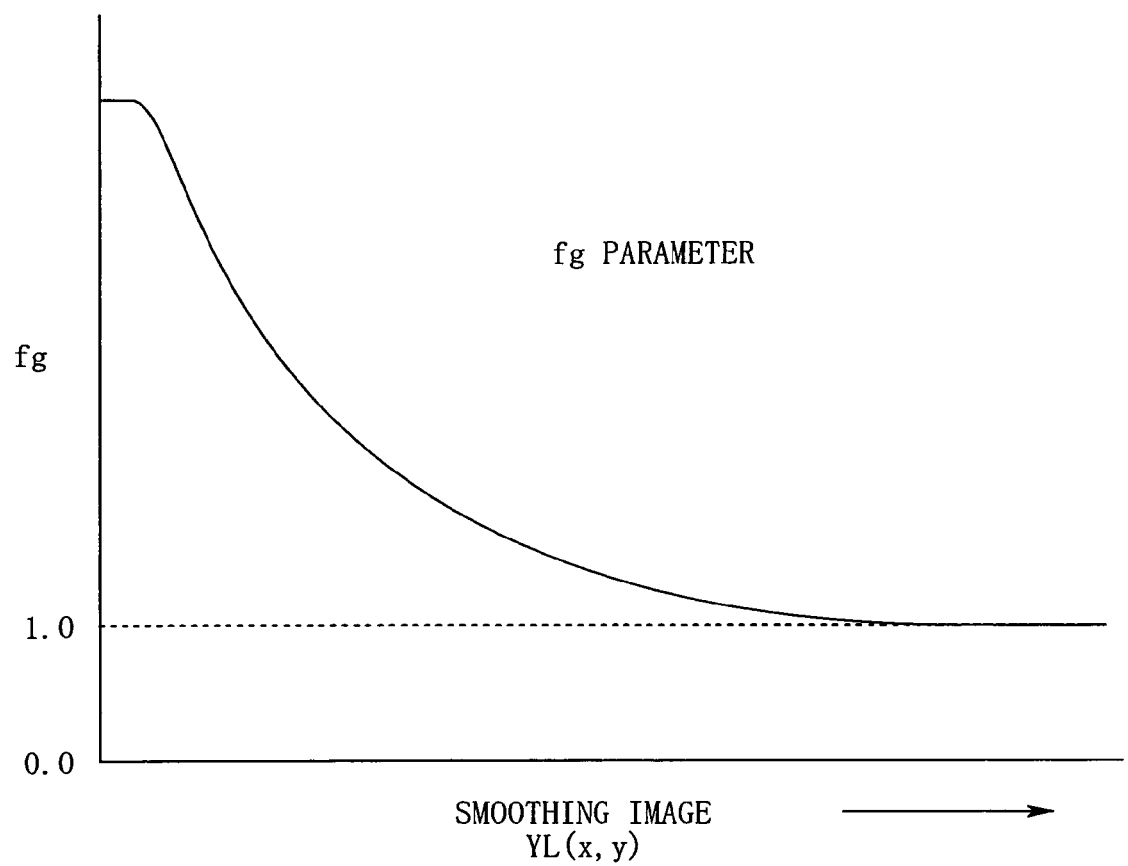
FIG. 7 shows an example of parameter fg [YL (x, y)].

FIG. 7 shows an example of parameter fg [YL (x, y)] in equation [3].

The smaller the YL (x, y) is (the darker the neighboring range including the pixel to be processed is), the larger the parameter fg [YL (x, y)] becomes. On the contrary, the larger the YL (x, y) is (the brighter the neighboring range including the pixel to be processed is), the closer to 1 the parameter fg [YL (x, y)] approaches.

The microprocessor 22 multiplies the representative value Mg of the brightness enhancement amount obtained in step S6 by the parameter fg [YL (x, y)], and obtains the gain map GM (xi y). Such a process adjusts the gain map GM (x, y) so as to be closer to the subject condition at the time of photographing.

Step S9: The microprocessor 22 performs gradation correction according to the gain map GM (x, y) such as the following equation on the signal component RGB of the image data, and obtains gradation-corrected image data RcGcBc.

$$Rc(x, y)=R(x, y)*GM(x, y)$$

$$Gc(x, y)=G(x, y)*GM(x, y)$$

$$Bc(x, y)=B(x, y)*GM(x, y)$$

Step S10: The card interface 20 compresses the gradation-corrected image data and stores it in the memory card 21.

[3] Effect of the Present Embodiment

In the present embodiment the brightness enhancement amount of the dark area gradation is adjusted according to the subject luminance in the image data. Therefore, the gradation correction of the image data can be controlled so as not to greatly deviate from the brightness of the actual subject, thereby obtaining a processing result which is close to the impression of appearance.

Particularly, with the present embodiment, parameter Kb [Bv (i)] shown in FIG. 3 reduces the brightness enhancement amount of the dark area gradation as the actual subject becomes darker. Therefore, brightness enhancement is suitably suppressed for actually dark image data such as night view photographing. Consequently, a processing result which is close to the impression of appearance of the night view can be obtained.

Furthermore, with the present embodiment, the product of parameter Kb [Bv (i)] shown in FIG. 3 and parameter fr [My (i)] shown in FIG. 4 is effective in raising the brightness enhancement amount of the dark area gradation as the signal component of the image data becomes relatively darker compared with the actual subject luminance. Therefore, the dark area gradation is corrected to be brighter for image data which is relatively darker than the impression of appearance. Consequently, a processing result which is close to the impression of appearance can also be obtained in this case.

Additionally, with the present embodiment, the brightness enhancement amount is set to be lower for regions located further from the center of the image, by parameter Kr (i) shown in FIG. 5. Therefore the brightness enhancement amount is prevented from rising extremely high even if the luminance of the periphery of the main subject is extremely bright such as in the case of backlight photographing. As a result, it is possible to appropriately determine the brightness enhancement amount based on the subject luminance at the center of the image.

Supplementary Items of the Embodiment

In the above-mentioned embodiment, brightness enhancement amount for each subregion is statistically processed to determine the brightness enhancement amount to be applied on the entire screen. However, the present invention is not limited to the above. For example, the brightness enhancement amount may be determined directly for the central region of the image data. In addition, the main subject region may be determined from face recognition or focal point detection area selection, whereby the brightness enhancement amount for the major subject region may be determined directly.

Additionally, with the above-mentioned embodiment, a case has been described in which the image processing apparatus of the present invention is mounted on the imaging apparatus 11. However, the present invention is not limited to the above. For example, the image processing apparatus may be implemented by software using a computer and an image processing program (see FIG. 2). In this case, a process similar to the present embodiment can be executed without having to input additional information by acquiring information of the subject condition (subject luminance or the like) from Exif information of the image data.

With the above-mentioned embodiment, information of the subject luminance is used as the subject condition at the time of photographing. However, the present invention is not limited to the above. For example, reflectance information of the subject, obtained by pre-emitting of flashlight or the like, may be used as a subject condition in place of the subject luminance.

Additionally with the above-mentioned embodiment, variation trend of each parameter (FIGS. 3-7) is specifically indicated. However, the present invention is not limited to the above. In practice, appropriate brightness enhancement amounts may be obtained experimentally in a plurality of test images, respectively, and the variation trend of each parameter may be determined so as to simulate them by equation [1].

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
    an input section which acquires image data and information about subject condition at a time of photographing said image data;
    a smoothing processing section which obtains a smoothing image from said image data;
    an adjusting section which determines a brightness enhancement amount of dark area gradation of said image data, depending on said subject condition; and
    a correcting section which corrects said dark area gradation of said image data according to said brightness enhancement amount determined by said adjusting section, wherein
    said adjusting section:
        divides an image of said image data into a plurality of subregions and determines said brightness enhancement amount for each of said subregions, and
        executes one of a group of processes composed of an averaging process, a weighted averaging process, a maximal value calculating process, and a mode value and intermediate value calculating process of said brightness enhancement amount for each of said subregions, to determine a representative value of said brightness enhancement amount; and
    said correcting section corrects said dark area gradation of said image data according to a gain map obtained by using said smoothing image and said representative value of said brightness enhancement amount.

2. The image processing apparatus according to claim 1, wherein
    said input section acquires information of subject luminance as said subject condition, and
    said adjusting section reduces said brightness enhancement amount of said dark area gradation as said subject luminance becomes lower.

3. The image processing apparatus according to claim 2, wherein
    said adjustment section raises said brightness enhancement amount of said dark area gradation as a signal component of said image data becomes relatively darker compared with said subject luminance.

4. The image processing apparatus according to claim 3, wherein
    said adjusting section determines said brightness enhancement amount to be lower for a subregion located nearer to a fringe of an image.

5. The image processing apparatus according to claim 2, wherein
    said adjusting section determines said brightness enhancement amount to be lower for a subregion located nearer to a fringe of an image.

6. The image processing apparatus according to claim 1, wherein said input section acquires information of subject luminance as said subject condition, and said adjustment section raises said brightness enhancement amount of said dark area gradation as a signal component of said image data becomes relatively darker compared with said subject luminance.

7. The image processing apparatus according to claim 6, wherein said adjusting section determines said brightness enhancement amount to be lower for a subregion located nearer to a fringe of an image.

8. The image processing apparatus according to claim 1, wherein said adjusting section determines said brightness enhancement amount to be lower for a subregion located nearer to a fringe of an image.

9. An imaging apparatus comprising:

an image processing apparatus according to claim 1; and an imaging section which photographs a subject to generate said image data, wherein said image processing apparatus corrects dark area gradation of said image data generated by said imaging section.

10. A non-transitory computer readable recording medium storing an image processing program which causes a computer to function as an image processing apparatus according to claim 1.

* * * * *

UNITED STATES PATENT AND TRADEMARK OFFICE
CERTIFICATE OF CORRECTION

PATENT NO. : 7,978,233 B2
APPLICATION NO. : 12/073346
DATED : July 12, 2011
INVENTOR(S) : Masaru Muramatsu It is certified that error appears in the above-identified patent and that said Letters Patent is hereby corrected as shown below:

Title page, item (75), change "Masaru Muramatsu, Yohohama (JP)"

to --Masaru Muramatsu, Yokohama (JP)--.

Signed and Sealed this
Twenty-second Day of November, 2011

David J. Kappos
*Director of the United States Patent and Trademark Office*